(12) United States Patent
Levi et al.

(10) Patent No.: US 10,841,243 B2
(45) Date of Patent: Nov. 17, 2020

(54) NIC WITH PROGRAMMABLE PIPELINE

(71) Applicant: MELLANOX TECHNOLOGIES, LTD., Yokneam (IL)

(72) Inventors: Dotan Levi, Kiryat Motzkin (IL); Liran Liss, Atzmon (IL); Haggai Eran, Yokneam Illit (IL); Noam Bloch, Bat Shlomo (IL); Idan Burstein, Carmiel (IL); Lior Narkis, Petach-Tikva (IL); Avraham Ganor, Shoham (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/012,826

(22) Filed: Jun. 20, 2018

(65) Prior Publication Data
US 2019/0140979 A1 May 9, 2019

Related U.S. Application Data

(60) Provisional application No. 62/582,997, filed on Nov. 8, 2017.

(51) Int. Cl.
*H04L 12/933* (2013.01)
*G06F 13/40* (2006.01)
(Continued)

(52) U.S. Cl.
CPC ...... *H04L 49/1546* (2013.01); *G06F 9/45558* (2013.01); *G06F 13/4068* (2013.01);
(Continued)

(58) Field of Classification Search
CPC . H04L 49/1546; H04L 49/9068; H04L 67/10; G06F 9/45558; G06F 13/4068; G06F 2009/45595
See application file for complete search history.

(56) References Cited

U.S. PATENT DOCUMENTS 6,901,496 B1    5/2005  Mukund et al.
7,657,659 B1    2/2010  Lambeth et al.
(Continued)

FOREIGN PATENT DOCUMENTS

EP      1657878 A1    5/2006
EP      2463782 A2    6/2012
WO      2010062679    6/2010

OTHER PUBLICATIONS

U.S. Appl. No. 15/701,459 office action dated Dec. 27, 2018.
(Continued)

*Primary Examiner* — Michael J Moore, Jr.
(74) *Attorney, Agent, or Firm* — Kligler & Associates Patent Attorneys Ltd

(57) ABSTRACT

A network interface controller that is connected to a host and a packet communications network. The network interface controller includes electrical circuitry configured as a packet processing pipeline with a plurality of stages. It is determined in the network interface controller that at least a portion of the stages of the pipeline are acceleration-defined stages. Packets are processed in the pipeline by transmitting data to an accelerator from the acceleration-defined stages, performing respective acceleration tasks on the transmitted data in the accelerator, and returning processed data from the accelerator to receiving stages of the pipeline.

22 Claims, 8 Drawing Sheets

(51) Int. Cl.
*G06F 9/455* (2018.01)
*H04L 12/861* (2013.01)
*H04L 29/08* (2006.01)

(52) U.S. Cl.
CPC .......... *H04L 49/9068* (2013.01); *H04L 67/10* (2013.01); *G06F 2009/45595* (2013.01)

(56) References Cited

U.S. PATENT DOCUMENTS

| | | | |
|---|---|---|---|
| 8,006,297 B2 | 8/2011 | Johnson et al. | |
| 8,103,785 B2 | 1/2012 | Crowley et al. | |
| 8,824,492 B2* | 9/2014 | Wang | G06F 21/602 |
| | | | 370/419 |
| 9,038,073 B2 | 5/2015 | Kohlenz et al. | |
| 9,678,818 B2 | 6/2017 | Raikin et al. | |
| 9,904,568 B2* | 2/2018 | Vincent | H04L 12/4633 |
| 10,078,613 B1 | 9/2018 | Ramey | |
| 10,120,832 B2 | 11/2018 | Raindel et al. | |
| 10,152,441 B2 | 12/2018 | Liss et al. | |
| 10,210,125 B2 | 2/2019 | Burstein | |
| 10,218,645 B2 | 2/2019 | Raindel et al. | |
| 10,423,774 B1 | 4/2019 | Zelenov et al. | |
| 10,382,350 B2* | 8/2019 | Bohrer | H04L 47/20 |
| 2003/0023846 A1 | 1/2003 | Krishna et al. | |
| 2004/0039940 A1 | 2/2004 | Cox et al. | |
| 2004/0057434 A1 | 3/2004 | Poon et al. | |
| 2004/0158710 A1 | 8/2004 | Buer et al. | |
| 2005/0102497 A1 | 5/2005 | Buer | |
| 2005/0198412 A1 | 9/2005 | Pedersen et al. | |
| 2006/0095754 A1 | 5/2006 | Hyder et al. | |
| 2006/0104308 A1 | 5/2006 | Pinkerton et al. | |
| 2009/0086736 A1 | 4/2009 | Foong et al. | |
| 2009/0106771 A1 | 4/2009 | Benner et al. | |
| 2009/0319775 A1 | 12/2009 | Buer et al. | |
| 2009/0328170 A1 | 12/2009 | Williams et al. | |
| 2010/0228962 A1 | 9/2010 | Simon et al. | |
| 2012/0314709 A1 | 12/2012 | Post et al. | |
| 2013/0080651 A1 | 3/2013 | Pope et al. | |
| 2013/0125125 A1 | 5/2013 | Karino et al. | |
| 2013/0142205 A1* | 6/2013 | Munoz | H04L 45/08 |
| | | | 370/419 |
| 2013/0263247 A1 | 10/2013 | Jungck et al. | |
| 2013/0276133 A1 | 10/2013 | Hodges et al. | |
| 2013/0329557 A1 | 12/2013 | Petry | |
| 2013/0347110 A1* | 12/2013 | Dalal | H04L 41/12 |
| | | | 726/23 |
| 2014/0129741 A1 | 5/2014 | Shahar et al. | |
| 2014/0185616 A1 | 7/2014 | Bloch et al. | |
| 2014/0254593 A1* | 9/2014 | Mital | H04L 12/18 |
| | | | 370/390 |
| 2014/0282050 A1 | 9/2014 | Quinn et al. | |
| 2014/0282561 A1 | 9/2014 | Holt et al. | |
| 2015/0100962 A1 | 4/2015 | Morita et al. | |
| 2015/0288624 A1 | 10/2015 | Raindel et al. | |
| 2015/0347185 A1 | 12/2015 | Holt et al. | |
| 2015/0355938 A1 | 12/2015 | Jokinen et al. | |
| 2016/0132329 A1 | 5/2016 | Gupte et al. | |
| 2016/0226822 A1* | 8/2016 | Zhang | H04L 49/25 |
| 2016/0330112 A1 | 11/2016 | Raindel et al. | |
| 2016/0330301 A1 | 11/2016 | Raindel et al. | |
| 2016/0342547 A1 | 11/2016 | Liss et al. | |
| 2016/0350151 A1 | 12/2016 | Zou et al. | |
| 2016/0378529 A1 | 12/2016 | Wen | |
| 2017/0075855 A1 | 3/2017 | Sajeepa et al. | |
| 2017/0180273 A1* | 6/2017 | Daly | H04L 69/22 |
| 2017/0237672 A1 | 8/2017 | Dalal | |
| 2017/0264622 A1 | 9/2017 | Cooper et al. | |
| 2017/0286157 A1* | 10/2017 | Hasting | G06F 9/505 |
| 2018/0004954 A1 | 1/2018 | Liguori et al. | |
| 2018/0067893 A1 | 3/2018 | Raindel et al. | |
| 2018/0109471 A1* | 4/2018 | Chang | H04L 49/70 |
| 2018/0114013 A1 | 4/2018 | Sood et al. | |
| 2018/0210751 A1 | 7/2018 | Pepus et al. | |
| 2018/0219770 A1 | 8/2018 | Wu et al. | |
| 2018/0219772 A1 | 8/2018 | Koster et al. | |
| 2018/0246768 A1 | 8/2018 | Palermo et al. | |
| 2018/0262468 A1 | 9/2018 | Kumar et al. | |
| 2018/0285288 A1 | 10/2018 | Bernat et al. | |
| 2018/0329828 A1 | 11/2018 | Apfelbaum et al. | |
| 2019/0012350 A1* | 1/2019 | Sindhu | G06F 15/17337 |
| 2019/0026157 A1 | 1/2019 | Suzuki et al. | |
| 2019/0116127 A1 | 4/2019 | Pismenny et al. | |
| 2019/0163364 A1 | 5/2019 | Gibb et al. | |
| 2019/0173846 A1 | 6/2019 | Patterson et al. | |
| 2019/0250938 A1 | 8/2019 | Claes et al. | |
| 2020/0012604 A1 | 1/2020 | Agarwal | |
| 2020/0026656 A1 | 1/2020 | Liao et al. | |

OTHER PUBLICATIONS

Dierks et al., "The Transport Layer Security (TLS) Protocol Version 1.2", Request for Comments: 5246 , pp. 1-104, Aug. 2008.
Turner et al., "Prohibiting Secure Sockets Layer (SSL) Version 2.0", Request for Comments: 6176, pp. 1-4, Mar. 2011.
Rescorla et al., "The Transport Layer Security (TLS) Protocol Version 1.3", Request for Comments: 8446, pp. 1-160, Aug. 2018.
Comer., "Packet Classification: A Faster, More General Alternative to Demultiplexing", the Internet Protocol Journal, vol. 15, No. 4, pp. 12-22, Dec. 201.
U.S. Appl. No. 15/146,013 Office Action dated Dec. 19, 2018.
Salowey et al., "AES Galois Counter Mode (GCM) Cipher Suites for TLS", Request for Comments: 5288, pp. 1-8, Aug. 2008.
International Application # PCT/IB2018/058705 search report dated Feb. 18, 2019.
International Application # PCT/IB2018/059824 search report dated Mar. 22, 2019.
Shirey., "Internet Security Glossary, Version 2", Request for Comments 4949, 365 pages, Aug. 2007.
Information Sciences Institute, "Transmission Control Protocol; DARPA Internet Program Protocol Specification", Request for Comments 793, 90 pages, Sep. 1981.
InfiniBand TM Architecture Specification vol. 1, Release 1.3, 1842 pages, Mar. 3, 2015.
Stevens, "TCP Slow Start, Congestion Avoidance, Fast Retransmit, and Fast Recovery Algorithms", Request for Comments 2001, 6 pages, Jan. 1997.
Netronome Systems, Inc., "Open vSwitch Offload and Acceleration with Agilio® CX SmartNICs", White Paper, 7 pages, Mar. 2017.
PCI Express® Base Specification ,Revision 3.0, 860 pages, Nov. 10, 2010.
Bohrer et al., U.S. Appl. No. 15/701,459, filed Sep. 12, 2017.
U.S. Appl. No. 15/146,013 office action dated May 18, 2018.
Menachem et al., U.S. Appl. No. 15/841,339, filed Dec. 14, 2017.
Pismenny et al., U.S. Appl. No. 62/572,578 dated Oct. 16, 2017.
European Application # 201668019 search report dated May 29, 2020.
Burstein, "Enabling Remote Persistent Memory", SNIA—PM Summit, pp. 1-24, Jan. 24, 2019.
Chung et al., "Serving DNNs in Real Time at Datacenter Scale with Project Brainwave", IEEE Micro Pre-Print, pp. 1-11, Mar. 22, 2018.
Talpey, "Remote Persistent Memory—With Nothing But Net", SNIA—Storage developer conference, pp. 1-30, year 2017.
Microsoft, "Project Brainwave", pp. 1-5, year 2019.
U.S. Appl. No. 16/202,132 office action dated Apr. 2, 2020.
U.S. Appl. No. 16/159,767 Office Action dated Oct. 1, 2020.

* cited by examiner

NIC WITH PROGRAMMABLE PIPELINE

CROSS-REFERENCE TO RELATED APPLICATIONS

This Application claims the benefit of U.S. Provisional Application No. 62/582,997, filed 8 Nov. 2017, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to digital data processing. More particularly, this invention relates to transfer of information between data networks and central processing units using hardware independent of the central processor.

2. Description of the Related Art

The meanings of certain acronyms and abbreviations used herein are given in Table 1.

TABLE 1

Acronyms and Abbreviations

| | |
|---|---|
| ASIC | Application-Specific Integrated Circuit |
| CPU | Central Processing Unit |
| DAG | Directed Acyclic Graph |
| DMA | Direct Memory Access |
| FPGA | Field Programmable Gate Array |
| GPU | Graphics Processing Unit |
| HCA | Host Channel Adapter |
| HT | Hyper Transport |
| IETF | Internet Engineering Task Force |
| LAN | Local Area Network |
| NIC | Network Interface Controller |
| NOC | Network On Chip |
| PCIe | Peripheral Component Interconnect Express |
| QP | Queue Pair |
| QPI | Quick Path Interconnect |
| RAID | Redundant Array of Independent Disks |
| RFC | Request for Comments |
| SBU | Sandbox Unit |
| SR-IOV | Single Root Input/Output Virtualization |
| VM | Virtual Machine |
| vNIC | Virtual NIC |
| WAN | Wide Area Network |

Data movements between a host, an accelerator and a network incur overhead that impacts system performance. A bus that interconnects these components is a particular bottleneck, as data may need to be transferred through the bus more than once. The problem has been addressed using a "bump-in-the-wire" architecture. This term is defined in Request for Comments (RFC) 4949 of the Internet Engineering Task Force (IETF) as an implementation approach that places a network security mechanism outside of the system that is to be protected. For example, commonly assigned U.S. Patent Application Publication No. 20160330301 by Raindel et al., which is herein incorporated by reference, discloses a bump-in-the-wire accelerator device that performs opportunistic decryption of received data when the packets carrying the data are received in order, without any packet loss. The accelerator logic decrypts the contents of these packets using computational context information, including cryptographic variables, from a table in local memory, and updating the table as required.

SUMMARY OF THE INVENTION

In one approach the following sequence occurs: Data received from the network is accelerated in the accelerator and a NIC. The data is then transmitted via the PCIe fabric to the host, already accelerated. The host sends un-accelerated data to the accelerator via a PCIe bus. The data is accelerated and transmitted to the network without passing via the PCIe bus again. However, this method has several downsides:

The accelerator (e.g., an FPGA) has to perform packet classification and parsing, in order to "understand" (1) what data needs to be accelerated, and (2) whether the data exists in a packet. The accelerator is further required to extract the context (key, state, operation) of the acceleration operation required by the packet.

For a non-virtualized environment (e.g., with no overlay network and a single software database), the packet classification and parsing task is considered doable. However, these tasks require that the accelerator implement the parsing logic. This increases power consumption and reduces the effective portion of the accelerator that can be used for actual acceleration. In a virtualized environment this approach is considered to be impractical, for example, due to high memory requirements and the difficulties imposed by the inconstancy of the virtualized environment.

A network node receives data to be processed in a local accelerator from other nodes or devices in the network. The node may additionally send results of accelerated processing tasks to the network. Embodiments of the present invention that are described herein provide improved methods and systems for data processing in nodes that employ accelerators. The terms "processing latency" or "processing delay" refer to the duration between message arrival and the processing start time. The duration between processing conclusion and the time of sending the results to the network is referred to herein as "sending latency" or "sending delay." The disclosed techniques reduce both processing and sending latencies.

In the disclosed embodiments, a network node comprises a host, an accelerator and a network adapter such as a NIC, which communicate with one another over an internal bus. In an exemplary embodiment, the accelerator may comprise a Field Programmable Gate Array (FPGA) or a Graphics Processing Unit (GPU) and the internal bus is a Peripheral Component Interconnect Express (PCIe) bus, or even a generic processor. In alternative embodiments, the node may comprise any other suitable network adapter, such as, for example, a Host Channel Adapter (HCA) in InfiniBand networks and other bus technologies.

The NIC contains a hierarchical packet processing pipeline that can be configured from several layers of software, isolated and independently of other modules, other VMs and other layers. Software applies packet processing rules, and the rules will be executed according to the hierarchy of the software. For example: in a received flow, a hypervisor may be the first hierarchical level, so the hypervisor rules will apply first to alter and forward the packet. Thereafter, at a second hierarchical level, a specific guest operating system or virtual machine may implement other rules using hardware as described below.

The packet processing pipeline is based on "match and action" rules. In embodiments of the invention, the accelerator is integrated with the packet processing pipeline, in the sense that it may be utilized repeatedly during processing of a packet in the pipeline, as is explained in further detail below. Examples of software that can utilize the pipeline include the hypervisor kernel of a virtual machine application in a virtual machine. Data is accelerated and embedded into a NIC steering pipeline, such that:

(1) The accelerator receives only data that needs to be accelerated.
(2) Needed acceleration instructions, e.g., a partial context of the packet, are provided to the accelerator by the NIC.
(3) Traffic can pass back and forth between the accelerator and the NIC multiple times and with different contexts, without traversing the PCIe fabric. The NIC takes on networking operations such as packet parsing, modification and checksum computation, while the accelerator performs the acceleration tasks. In other words, the accelerator does not need to accelerate operations than can be done by the NIC, e.g., packet parsing, checksum, some encryption protocols, and signature. The accelerator only performs specified acceleration tasks.

Application of the principles of the invention reduces PCIe traffic and host overhead in virtualized and non-virtualized environments. This allows relatively smaller accelerators to handle high bandwidth data.

There is provided according to embodiments of the invention a method of communication, which is carried out by receiving a packet in a network interface controller that is connected to a host and a communications network. The network interface controller includes electrical circuitry configured as a packet processing pipeline with a plurality of stages. The method is further carried out by determining in the network interface controller that at least a portion of the stages of the pipeline are acceleration-defined stages, processing the packet in the pipeline by transmitting data to an accelerator from the acceleration-defined stages, performing respective acceleration tasks on the transmitted data in the accelerator, and returning processed data from the accelerator to receiving stages of the pipeline. The method is further carried out after processing the packet in the pipeline by routing the packet toward a destination.

In one aspect of the method the stages of the pipeline are organized as a hierarchy and each of the levels of the hierarchy by are configured by processes executing in respective domains.

According to a further aspect of the method the receiving stages differ from the acceleration-defined stages.

Yet another aspect of the method includes accessing the network interface controller by a plurality of virtual machines having respective virtual network interface controllers, and processed data that is returned from the accelerator is transmitted from one of the virtual network interface controllers to another of the virtual network interface controllers.

In still another aspect of the method, transmitting data to an accelerator includes adding metadata to the data, and determining in the accelerator responsively to the metadata whether to perform acceleration on the data or to direct the data to the communications network.

An additional aspect of the method includes performing one of the acceleration tasks in a sandbox unit of the accelerator, thereafter reporting a status of the one acceleration task from the accelerator to the network interface controller, and responsively to the status returning the processed data to the accelerator to perform another acceleration task. The one acceleration task can be a decryption of a portion of the packet, and the other acceleration task can be an acceleration of the decrypted portion of the packet.

According to one aspect of the method, transmitting data to an accelerator includes transmitting an indication to perform a specified acceleration task.

According to a further aspect of the method, transmitting data to an accelerator is performed in one virtual machine, and the indication includes an instruction to the accelerator to route the processed data to the host for use in another virtual machine.

According to yet another aspect of the method, routing the packet toward a destination includes routing the packet to the communications network while avoiding transmitting the packet to the host.

There is further provided according to embodiments of the invention a communications apparatus, including a host processor, a network interface controller coupled to the host processor and to a communications network, electrical circuitry configured as a multi-stage packet processing pipeline and an accelerator linked to the network interface controller. The network interface controller is configured for receiving a packet, determining that at least a portion of the stages of the pipeline are acceleration-defined stages, and processing the packet in the pipeline, wherein processing the packet includes transmitting data to the accelerator from the acceleration-defined stages, performing respective acceleration tasks on the transmitted data in the accelerator, returning processed data from the accelerator to receiving stages of the pipeline, and thereafter routing the packet toward a destination.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.
System Description.

Figure 1:
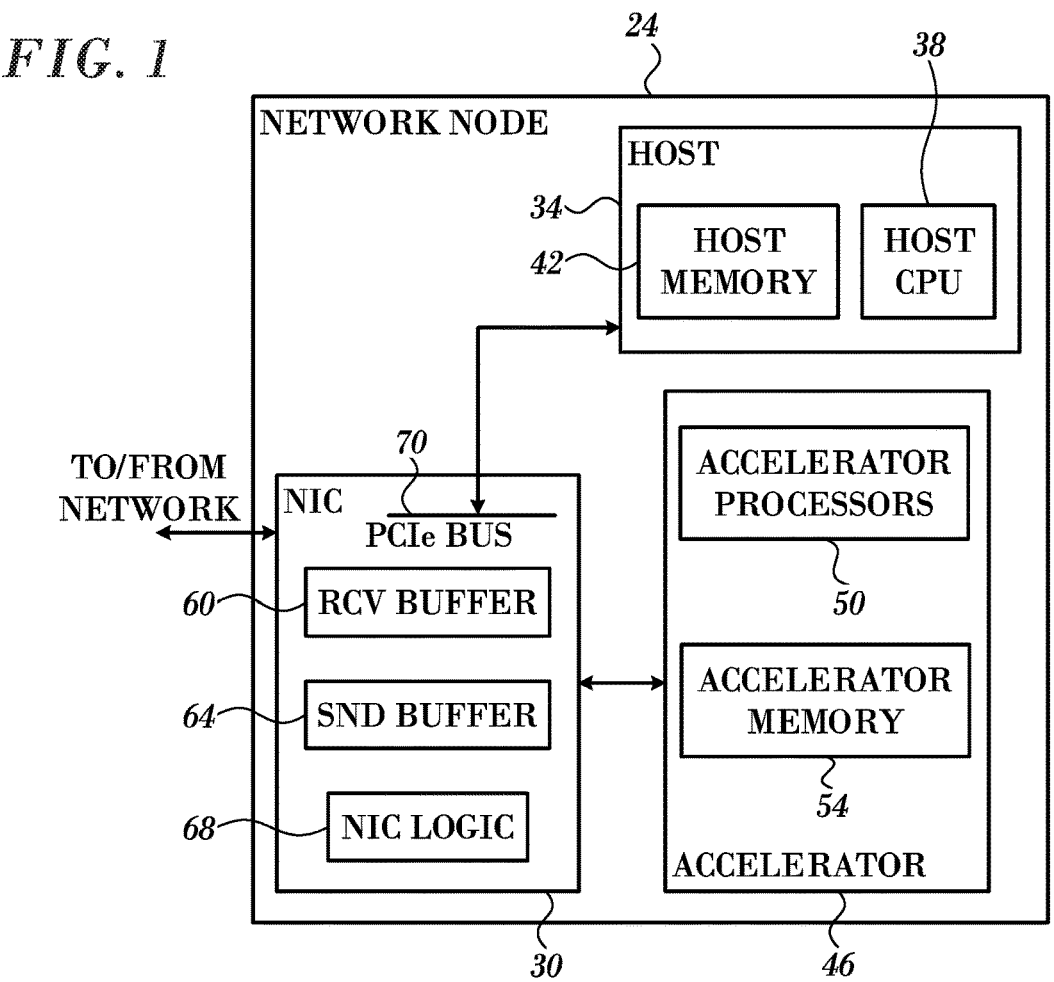
FIG. 1 is a block diagram that schematically illustrates a network node, in accordance with an embodiment of the present invention.

Turning now to the Drawings, FIG. 1 is a block diagram that schematically illustrates a network node 24 in accordance with an embodiment of the present invention. Node 24 can be part of any suitable communication network and related protocols. For example, the network may comprise a local or a wide area network (WAN/LAN), a wireless network or a combination of such networks, based for example on the geographic locations of the nodes. Additionally, the network may be a PCIe bus, or packet network such as Network On Chip (NOC), IP, InfiniBand or Ethernet network delivering information at any suitable data rate.

Node 24 comprises a network interface controller (NIC) 30 for communicating with other nodes or devices in the network, and a host 34 that carries out the various tasks of the node. Host 34 comprises a central processing unit (CPU) 38, and a host memory 42 for storing code and data.

Processing data in a network node comprises various functions or jobs that can be expedited by offloading them to a hardware accelerator. Node 24 further comprises a processing accelerator 46 that can process data sent, for example, from some remote node or device. Typically, accelerator 46 comprises one or more processors 50 and an accelerator memory 54. Typical acceleration tasks include: IP fragmentation, IP defragmentation, NAT, encryption, decryption, compression, decompression, processing regular expressions, video encoding, decoding and transcoding, video downscaling and upscaling, traffic monitoring, traffic load balancing, scheduling, authentication, IP security (IP-SEC), SSL/TLS protocols, and other cypher algorithms.

In some embodiments, accelerator 46 comprises a field programmable gate array having processors 50. Alternatively, the accelerator 46 may be realized as a graphics processing unit, in which processors 50 comprise multiple GPU cores that are typically designed for parallel rather than linear processing. In alternative embodiments, however, any other accelerator can also be used, such as, for example, an application-specific integrated circuit (ASIC), a ciphering accelerator, or an accelerator suitable for a storage system implementing a redundant array of independent disks (RAID). The accelerator and the host may reside in a common package or implemented on separate packages.

Node 24 receives data from and sends data to the network using NIC 30. NIC 30 stores data received from the network in a receiver buffer 60, and data to be sent to the network in a sender buffer 64. NIC logic 68 manages the various tasks of NIC 30.

Host 34, accelerator 46 and NIC 30 communicate with one another via a high speed bus 70 or crossbar. In some embodiments, bus 70 comprises a Peripheral Component Interconnect Express (PCIe) bus. In alternative embodiments, bus 70 may comprise any suitable bus, such as, for example, Intel's Quick Path Interconnect (QPI) bus, or AMD's Hyper Transport (HT) bus. In some embodiments, host 34 comprises a PCIe switch (not shown), to which the accelerator and the NIC connect using bus 70. The NIC, the accelerator and the host may connect to separate buses of different technologies, and interconnect via dedicated interfaces. Alternatively, the accelerator may be incorporated within the NIC.

Bus 70 enables NIC 30 to directly access host memory 42 and accelerator memory 54. In some embodiments, the host and/or accelerator memories are not fully accessible, and the NIC has access to only parts of host memory 42 and/or processors 50. A bus architecture feature that enables a device connected to the bus to initiate transactions is also referred to as "bus mastering" or direct memory access (DMA). The access time between processors 50 and accelerator memory 54 within the accelerator is typically faster than communication transactions made over bus 70. Nevertheless, the bus 70 can be a bottleneck in data movements that include: data sent from the host 34 to the accelerator 46 for acceleration; accelerated data sent from the accelerator 46 to the host 34; and accelerated data transmitted from the host 34 via the NIC 30 to the network. The bus 70 can become overloaded, as data may need to be transferred twice (read and write). This effectively doubles the latency when data is passed via the bus 70.

The configuration of node 24 in FIG. 1 is an example, which is chosen purely for the sake of conceptual clarity. In alternative embodiments, any other suitable node configuration can also be used. The different elements of node 24, such as NIC 30 and accelerator 46, may be implemented using any suitable hardware, such as in an application-specific integrated circuit or a field-programmable gate array. In some embodiments, some elements of node 24 can be implemented using software, or using a combination of hardware and software elements.

In some embodiments, certain node elements, such as host CPU 38, may comprise a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

First Embodiment

Figure 2:
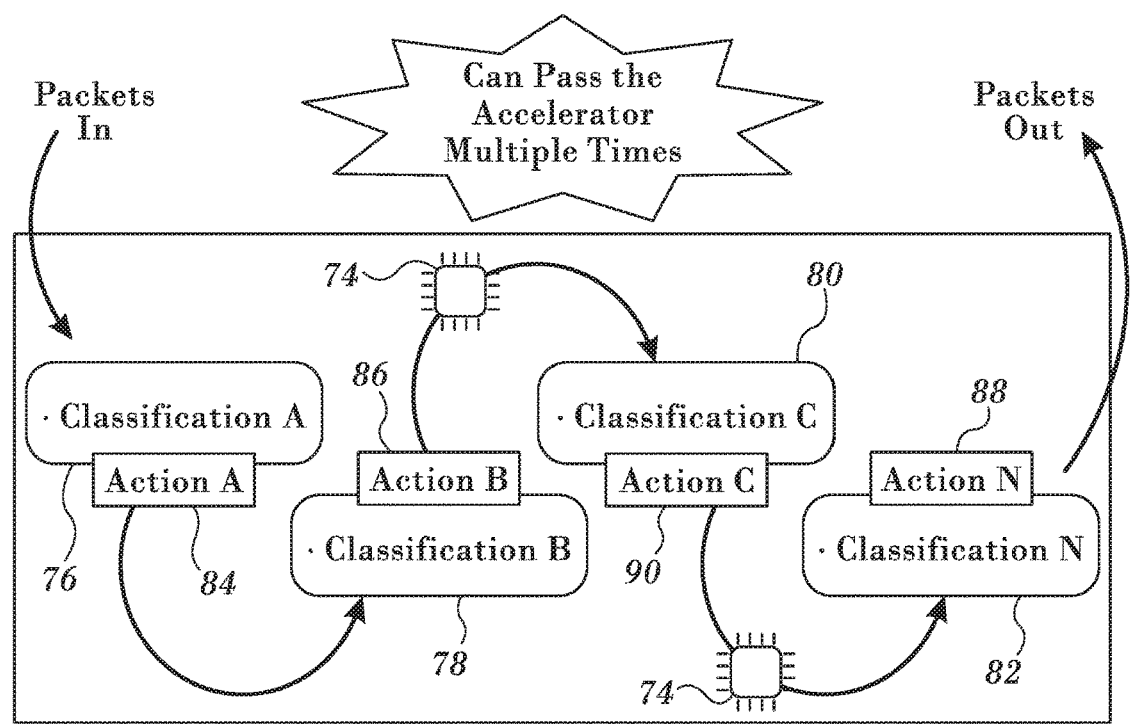
FIG. 2 is a schematic flow diagram of a packet processing pipeline in a network nodes using accelerator logic in accordance with an embodiment of the invention.

Reference is now made to FIG. 2, which is a schematic flow diagram of a packet processing pipeline 72 in a network nodes using accelerator logic 74 in accordance with an embodiment of the invention. In one embodiment the accelerator that interacts with the pipeline 72 is implemented as a field programmable gate array. As noted above, processing a packet can involve several tasks involving packet classification and extraction of embedded information. These are indicated representatively as stages 76, 78, 80, 82, which typically involve analysis of any header (sub-header or masked header) of the packet, regardless of whether it arrives from the host or from the network. The stages 76, 78, 80, 82 result in actions 84, 86, 88, 90. Examples of actions that may be performed in the accelerator include: packet steering and forwarding, packet drop; allow, e.g., based on maximum allowable packet size; drop; set counter; send to monitor QP; encapsulation; decapsulation; report flow ID; header rewrite, and hairpin mode. Stages resulting in actions requiring acceleration or otherwise requiring acceleration are referred to herein as "acceleration-defined stages".

Stage 76 and action 84 are be accomplished in the NIC. Stage 78 results in action 86, which is performed in the accelerator. The results of action 86 is returned to the NIC, which then begins stage 80. This results in action 90, which also is performed in the accelerator. Finally stage 82 and action 88, accomplished without need for the accelerator, results in a disposition of the packet. The chain of events in FIG. 2 constitutes an exemplary pipeline. Depending on the application, transmission protocol, and type of packet any number of invocations of the accelerator and return of the results to the NIC may occur in different configurations of the pipeline.

An important aspect of the pipeline 72 is operations on metadata that the NIC passes to the accelerator or is passed from the accelerator to the NIC. Use of this metadata makes the accelerator: smaller, easier to use, and more general. Relevant metadata include: metadata that is passed to and from applications; metadata that is created by applications running on the CPU and consumed by the accelerator; and metadata that is created by the accelerator and consumed by applications running on the CPU. Typical relevant metadata include packet payload length, flow identification, key index and packet header information, including errors in the headers. Other categories of metadata include metadata used for packet steering in the NIC, and metadata returned by the accelerator that can be used by the NIC as a source for subsequent match-action operations.

Metadata may be transferred as part of a descriptor over a PCI-based protocol, or as a packet header or encapsulation layer.

Second Embodiment

Figure 3:
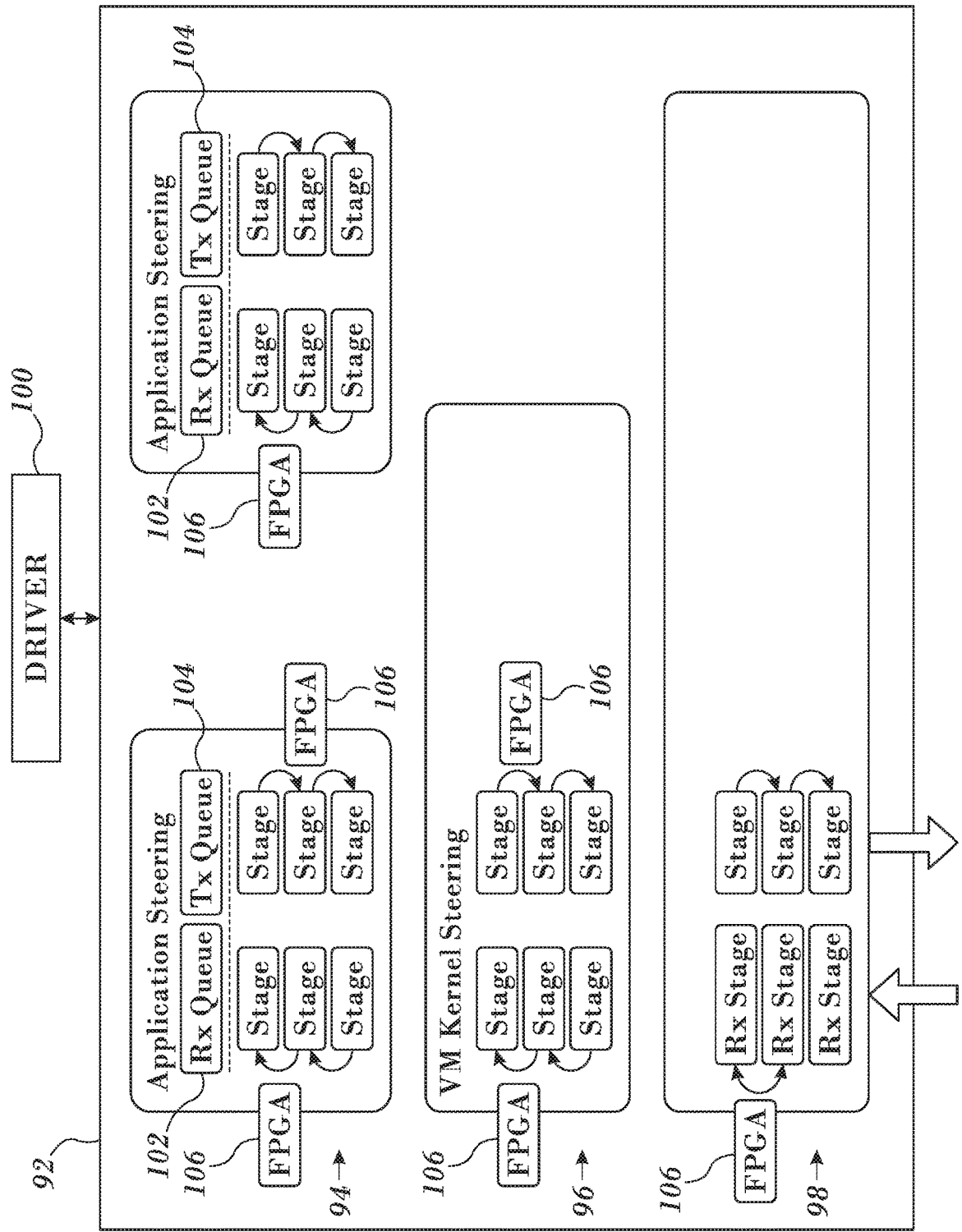
FIG. 3 is a block diagram of a hierarchical pipeline in accordance with an embodiment of the invention.

In this embodiment the NIC contains a hierarchical pipeline, typically implemented as configurable electrical circuitry. Details of the circuitry are omitted, as they will be known to those skilled in the art. Layers of the hierarchy may be configured by layers of software, independently of other layers. FIG. 3 is a block diagram of a hierarchical multistage pipeline 92, which can be implemented in an NIC in accordance with an embodiment of the invention. A virtual machine embodiment is shown; however this is not necessarily the case. The principals apply, mutatis mutandis, to non-virtual environments as well.

Each of the layers 94, 96, 98 constitutes a separate domain. Layer 98 is a component of an embedded switch that deals with initial reception and final transmission of packets. It is typically configured by NIC driver 100. Layer 96 involves packet steering controlled in the kernel, e.g., in the NIC driver 100. Layer 94 involves packet steering controlled by any number of applications executing in one or more virtual machines, of which two are shown in FIG. 3. Normally the configurations of layers 94, 96 are defined by software in the kernel and applications, respectively, but are mediated by instructions to the driver 100.

Separate processing pipelines may be provided in the layers 94, 96, 98 for incoming and outgoing packets. The pipelines are fed to and from receiving queues 102 and transmission queues 104. As noted above in the discussion of FIG. 2, at least a portion of the processing stages may involve transmission of data to an accelerator 106. In this example the accelerator 106 is realized as a field programmable gate array.

Figure 4:
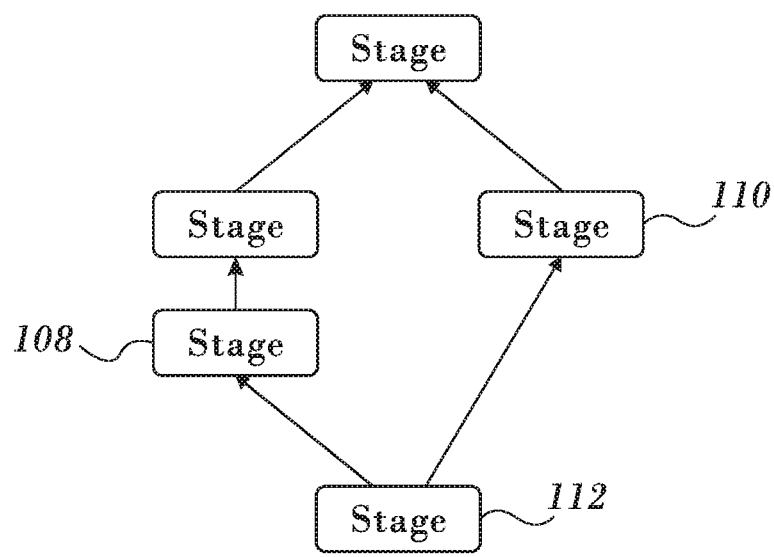
FIG. 4 is a diagram illustrating an alternate configuration of a pipeline in accordance with an embodiment of the invention.

While a linear arrangement is shown in the examples of FIG. 2 and FIG. 3, in some embodiments the stages that do not operate in a linear sequential order could operate in parallel. FIG. 4 is a diagram in which stages 108, 110 may operate concurrently and optionally in alternate paths following completion of stage 112. Many such non-linear arrangements of embodiments of a pipeline are possible, and may be conveniently modeled as a directed acyclic graph (DAG).

Indeed, in embodiments of the pipeline, the output of a stage could be returned to a previous stage of the same domain, although this presents difficulties in actual practice. For example, an infinite loop might occur, which would need to be detected and dealt with, possibly resulting in packet loss.

Operation.

Figure 5:
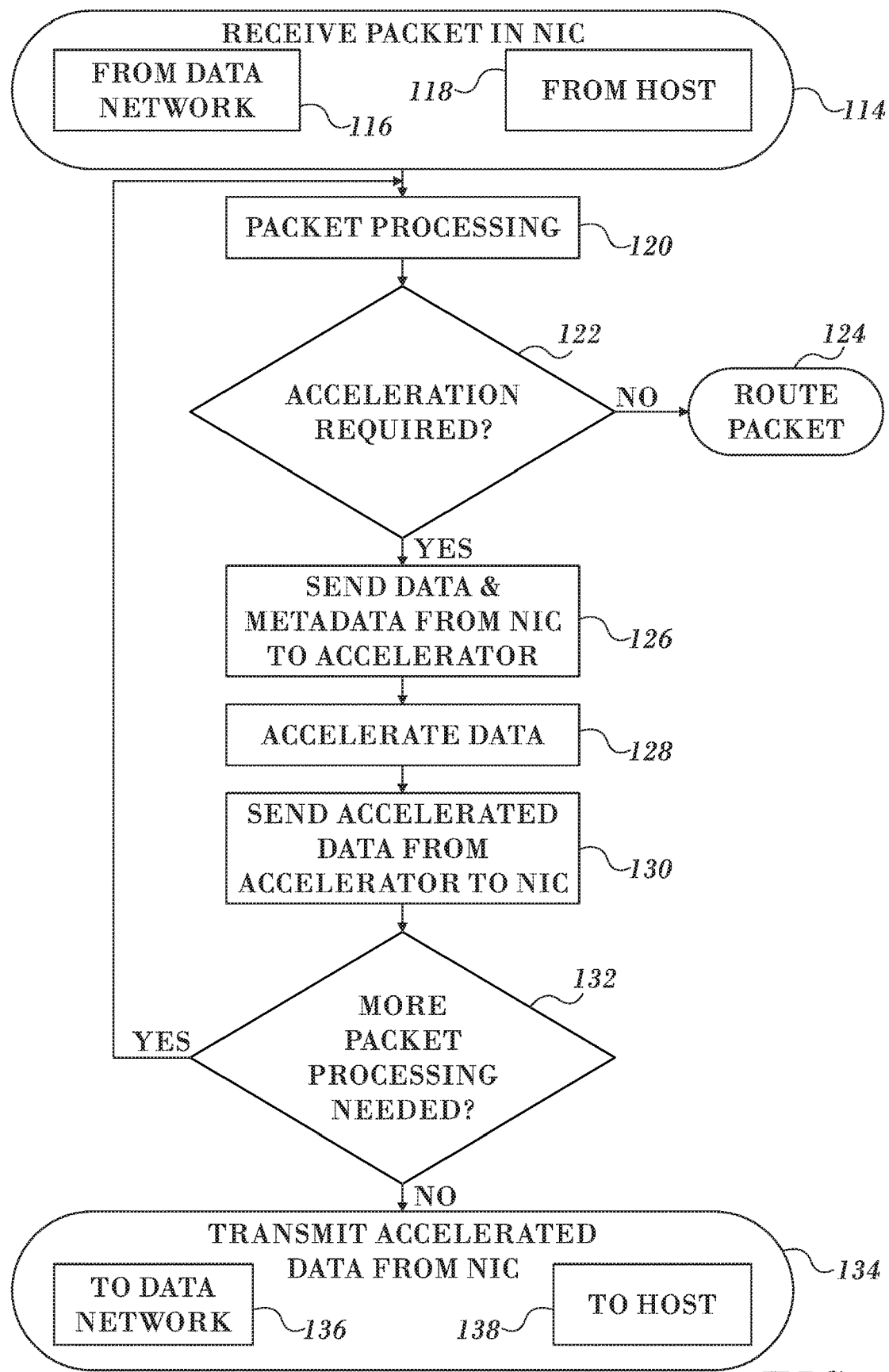
FIG. 5 is a flow chart of a method of accelerating packet data in accordance with an embodiment of the invention.

Reference is now made to FIG. 5, which is a flow chart of a method of accelerating packet data, in accordance with an embodiment of the invention. The process steps are shown in a particular linear sequence in FIG. 5 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method. At initial step 114 a packet is received in a NIC. It is assumed that software has been prepared to configure a pipeline, e.g., pipeline 72 (FIG. 2) to conform to the acceleration requirements of the received packet. Many pipeline configurations may be provided to accommodate different types of packets by suitably programming software or firmware in the NIC.

For example, for an encrypted packet in an overlay network. A typical hypervisor pipeline configuration might be:

If packet includes a node vxlan and vxlan id is X, then pass packet to Guest Y.

Guest Y: If packet is encrypted, then:

Accelerate using key=9;

Count packet; and

Send packet to queue #7.

Initial step 114 comprises step 116 in which the packet arrives from the data network, and step 118, in which the packet is transmitted to the NIC from the host.

Next, after performing initial step 114, packet processing tasks begin in step 120. At decision step 122, it is determined if the packet requires acceleration. If the determination at decision step 122 is negative, then control proceeds to final step 124. The packet is routed conventionally by the NIC to the host or to the network, as the case may be.

If the determination at decision step 122 is affirmative, then control proceeds to step 126. At least a portion of the packet data, e.g., the packet header, is sent to an accelerator, such as the accelerator 46 (FIG. 1). The packet data can be accompanied by metadata generated by the NIC, which provides guidance to the acceleration task to be performed in the accelerator. Exemplary guidance could be:

1. Payload starts within offset 86 bytes. The accelerator does not need to parse the header.

2. Acceleration operation is <encrypt using AES GCM> The accelerator doesn't need to understand what to do.

3. Stage the packet in the accelerator memory (if multiple accelerations are needed).

For example, the flow identification could be extracted from the packet. Another acceleration task might be the determination of quality-of-service requirements for the packet, which would influence its subsequent handling in the host.

Next, at step 128 the acceleration task specified by the metadata in step 126 is performed by acceleration logic in the accelerator. Then, in step 130 the accelerated data is returned to the NIC.

Next, at decision step 132, it is determined if more packet processing tasks need to be performed. The NIC is responsive in this step to the pre-programmed software defining the acceleration pipeline. If the determination at decision step 132 is affirmative, then control returns to step 120, which may require more data and metadata to be submitted to the accelerator.

If the determination at decision step 132 is negative, then control proceeds to final step 134. Final step 134 comprises step 136 in which data is sent to the network. The data may be included in a modification of the packet being currently processed, or in another format. Alternatively, the data may be incorporated in a new packet, and comprises step 138 in which data is sent to the host.

Third Embodiment

Figure 6:
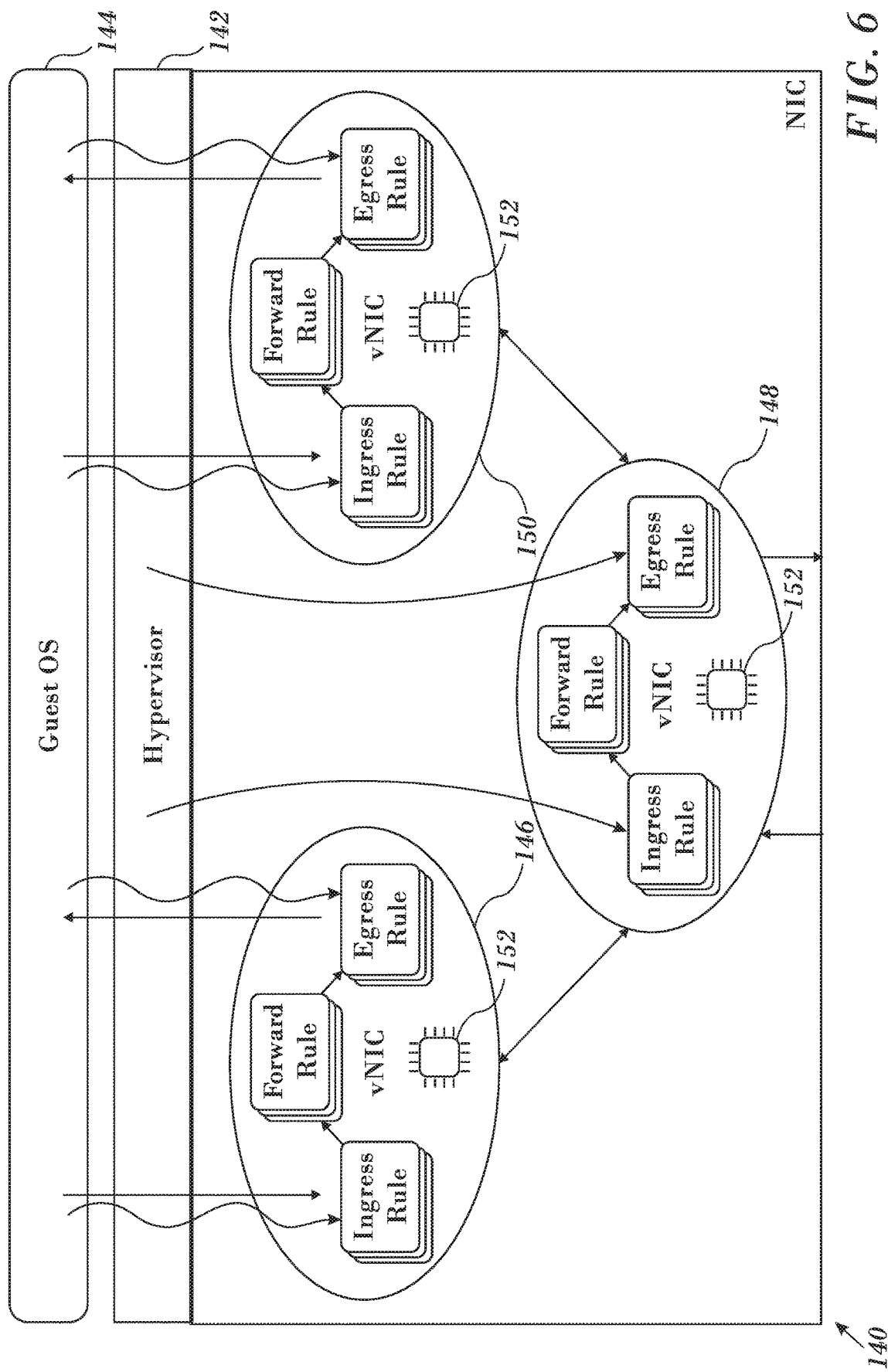
FIG. 6 is a schematic diagram of a virtual machine, which is operative in accordance with an embodiment of the invention.

Reference is now made to FIG. 6, which is a schematic diagram of a virtual machine 140 that is operative in accordance with an embodiment of the invention. The virtual machine 140 includes a hypervisor 142 operating under guest operating system 144. Stages performed in virtual NICs (vNICs 146, 148, 150) may cooperate in performing stages of a pipeline such as the pipeline 72 (FIG. 2) The output of some stages in the pipeline may be passed to the guest operating system 144 or, in some cases to another other vNIC. Each of the virtual NICs may interact with a virtual accelerator 152.

Fourth Embodiment

Figure 7:
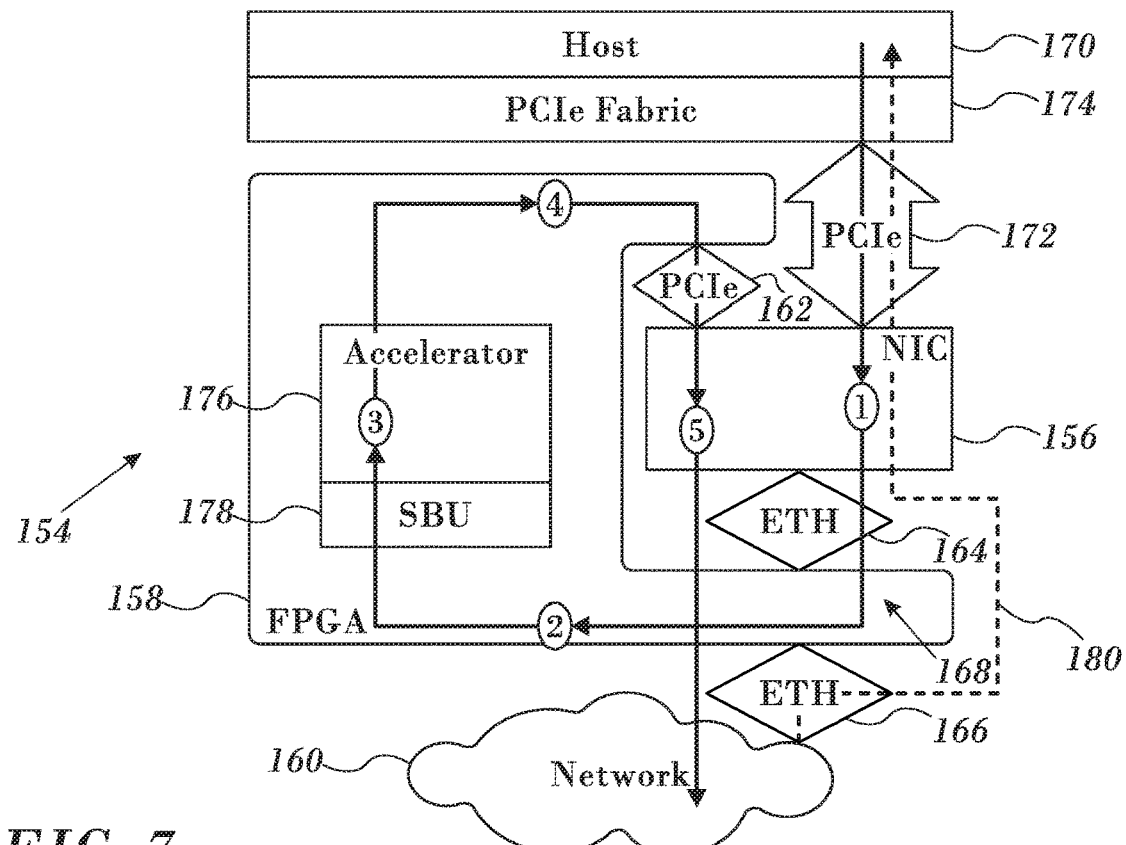
FIG. 7 is a schematic diagram of a network node, which is operative in accordance with an embodiment of the invention.

Reference is now made to FIG. 7, which is a schematic diagram of a network node 154, which is operative in accordance with an embodiment of the invention. Network node 154 includes NIC 156 connected to FPGA 158 and network 160. FPGA 158 and NIC 156 are connected by a PCIe interface 162 and with network 160 by an Ethernet interfaces 164, 166. Region 168 of FPGA 158 that is interposed between the Ethernet interfaces 164, 166 represents the function "bump in the wire". Normally the core performance of NIC 156 is much higher than the network speed.

The PCIe interface 162 connects FPGA 158 with NIC 156 as a different entity from host 170. A separate PCIe switch 172 connects the host 170 and NIC 156 through PCIe fabric 174. A software-configured steering table in NIC 156 directs the packet to FPGA 158 each time an action is required. The packet may be accompanied by metadata added by NIC 156, which allows FPGA 158 to understand the context of the packet, and to allow NIC 156 to continue the packet processing pipeline from the place where it left off. The metadata also enables FPGA 158 to identify network errors in the packet (confirmed by NIC 156), and enables FPGA 158 to report the acceleration status of the packet.

The diagram of FIG. 7 and the following diagrams disclose several modes of cooperation between NIC 156 and FPGA 158. The sequences of data flow in the diagrams are represented by numbered ellipses. In FIG. 7 the host 170 sends data to the network 160. NIC 156 receives the data and determines that it requires acceleration. It adds metadata to the packets and transmits them via the Ethernet interface 164 to FPGA 158. FPGA 158 determines whether the packet requires acceleration tasks or if it should be immediately sent to the network 160. When the packet requires acceleration, acceleration logic 176 in FPGA 158 performs the acceleration in a configurable sandbox unit (SBU) 178, then sends it back to NIC 156 via PCIe interface 162 with an acceleration status such as completed, failed, acceleration result, etc. NIC 156 may then determine whether to send the packet that was received from FPGA 158 to the network 160 and thereby prevent the packet from reaching the host. For example, if the acceleration failed, NIC 156 may decide that the packet is to be dropped and reported to the sender.

Additional benefits of the architecture, shown in FIG. 7 and the following drawing figures are shown by a broken line 180, which indicates data flow of non-accelerated traffic. Non-accelerated traffic is not passed through FPGA 158 and logic 176, but rather transferred directly between NIC 156 and the host 170 via the PCIe fabric 174. The acceleration logic 176 is unaware of this traffic. The result is to reduce development effort and the dependency on the resources of FPGA 158.

Fifth Embodiment

Figure 8:
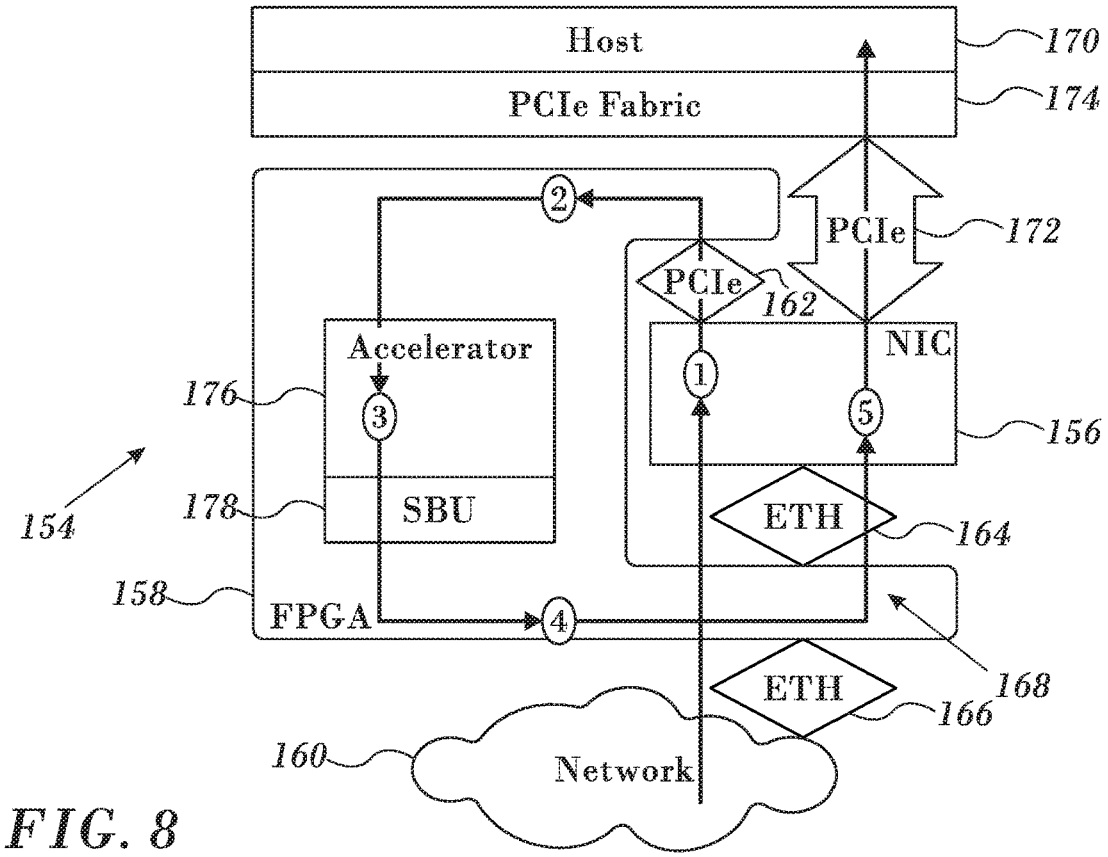
FIG. 8 is a schematic diagram of a network node, which illustrates an alternate mode of operation in accordance with an embodiment of the invention.

Reference is now made to FIG. 8, which is a schematic diagram of the network node 154, which illustrates an alternate mode of operation in accordance with an embodiment of the invention. In FIG. 8, data arrives into NIC 156 from the network 160. NIC 156 classifies the data and determines that it requires acceleration. It adds metadata to the packets and transmits them via the PCIe interface 162 or via another interface, e.g. Ethernet interface 164 to FPGA 158. FPGA 158 determines whether the packet requires acceleration tasks, and when it does, it performs the acceleration in the sandbox unit module 178, then sends it back to NIC 156 to a subsequent stage in the pipeline with an acceleration status such as completed, failed, acceleration result, etc. NIC 156 may determine whether to send the packet received from the accelerator to the host 170 via the PCIe fabric 174. If another acceleration is needed NIC 156 may again transfer the packet to FPGA 158 with new acceleration instructions.

Sixth Embodiment

Figure 9:
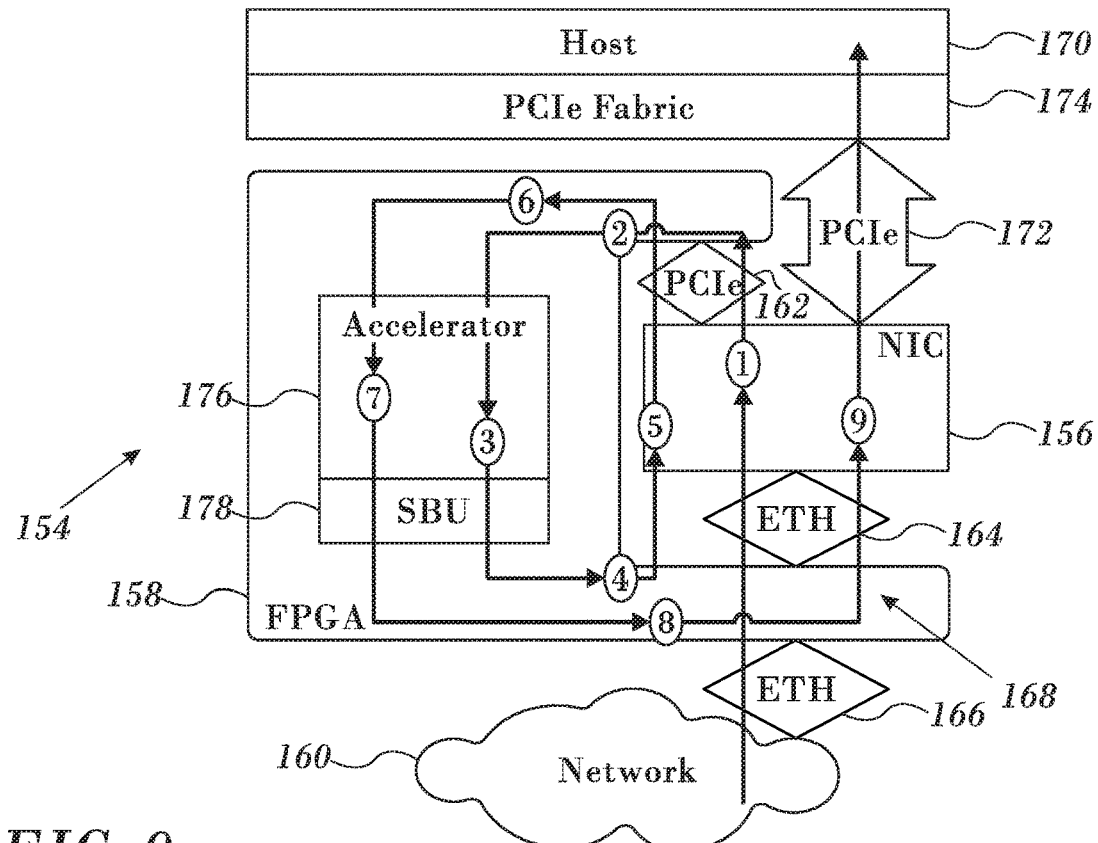
FIG. 9 is a schematic diagram of a network node illustrating multiple acceleration procedures for a packet while receiving traffic in accordance with an alternate embodiment of the invention.

Reference is now made to FIG. 9, which is a schematic diagram of the network node 154, illustrating multiple acceleration procedures for a packet while receiving traffic in accordance with an alternate embodiment of the invention. In FIG. 9 data arrives in NIC 156 from the network 160. NIC 156 classifies the data and determines that it requires acceleration. It adds metadata to the packets and transmits them via the PCIe interface 162 (flow 1) or via another interface, the Ethernet interface 164 to FPGA 158. In flow 2, FPGA 158 determines whether the packet requires acceleration tasks, and when it does, it performs the acceleration (flow 3) in the sandbox unit 178, then sends it back to NIC 156 (flow 4) with an acceleration status such as completed, failed, acceleration result, etc. In flow 5, NIC 156 determines whether additional acceleration is required. This may be required for various reasons, for example, the packet was decrypted and additional headers or metadata were exposed. Additional computation may be performed on the decrypted data in FPGA 158. In other cases, the packet may be intentionally designated to undergo more than one acceleration procedure.

Seventh Embodiment

Figure 10:
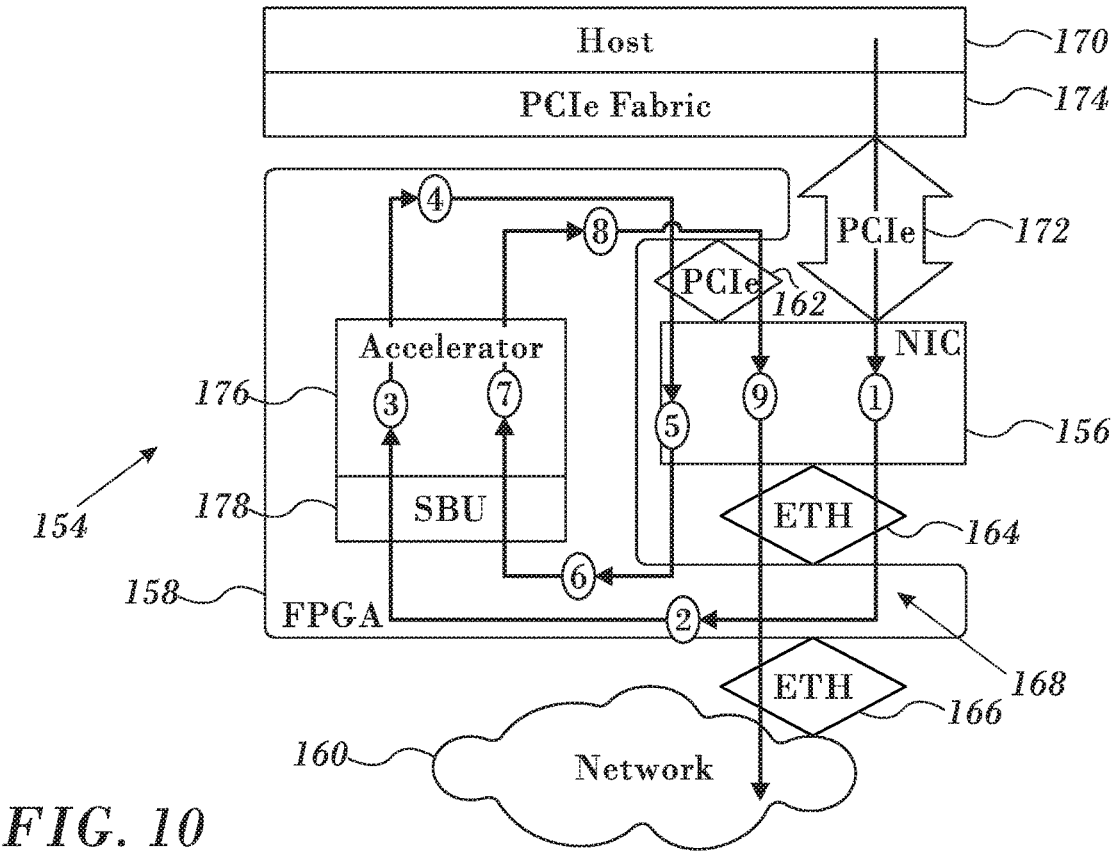
FIG. 10 is a schematic diagram of a network node illustrating multiple acceleration procedures for a packet while receiving traffic in accordance with an alternate embodiment of the invention.

Reference is now made to FIG. 10, which is a schematic diagram of the network node 154, which illustrates multiple acceleration procedures during transmission of a packet as an alternate mode of operation in accordance with an embodiment of the invention. In FIG. 10, data arrives at NIC 156 from the host 170 via the PCIe fabric 174 (flow 1). Software in the host, either in the hypervisor or the guest operating system, has pre-configured the NIC steering rules to accelerate the data. NIC 156 transfers the data to FPGA 158 via the Ethernet interface 164. FPGA 158 identifies, using "hints", i.e., indications provided by the NIC in metadata, that the data is on an accelerated route (flow 2). A hint comprises information or indications that the NIC 156 sends to the accelerator and by that, allows the accelerator to operate flexibly. For example, exploiting the hint, the accelerator may utilize less logic, or to be stateless. The nature of the hint is application dependent. Typically, the information in such hints is relatively easy to obtain in the NIC, but not easily derived within the accelerator itself. Such indications may be no more than a single bit in the metadata. FPGA 158 passes the data through acceleration logic 176 inside FPGA 158 (flow 3).

Routing decisions are always made by the NIC 156, not in the FPGA 158. However, the FPGA 158 make needed information available so that the NIC 156 can make the correct decision, for example whether the acceleration operation has succeeded or failed. The FPGA 158 sends the data back to NIC 156 through the PCIe interface 162 in flow 4. NIC 156 now determines that one or more additional acceleration procedures are needed and sends the data to FPGA 158 through the Ethernet interface 164, with new "hints" in flow 5. In this figure, flow 6 is similar to flow 2, flow 7 is similar to flow 3, flow 8 is similar to flow 4, and flow 9 represents the final pass through NIC 156, after all the acceleration passes in FPGA 158 have been completed. NIC 156 then sends the data to the network 160, including stateless offloads such as checksums that do not require the accelerator.

Eighth Embodiment

Figure 11:
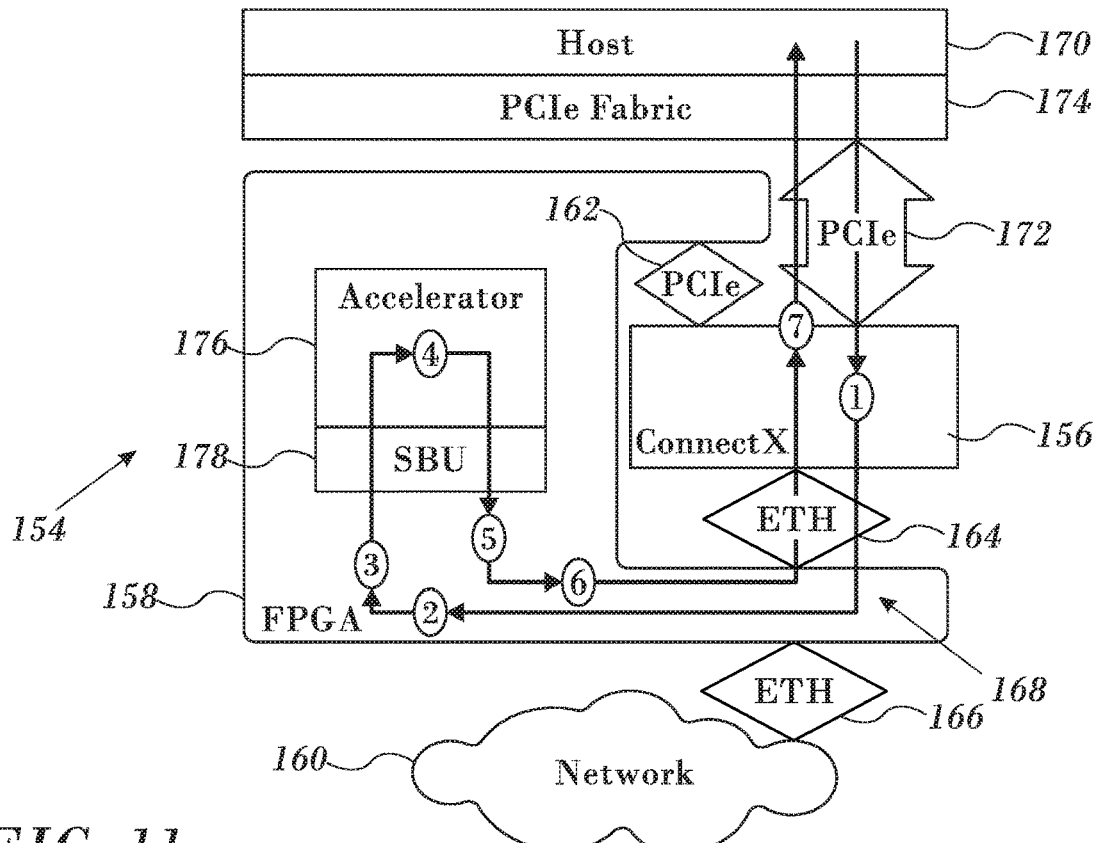
FIG. 11 is a schematic diagram of a network node, which illustrates an alternate mode of operation in accordance with an embodiment of the invention.

Reference is now made to FIG. 11, which is a schematic diagram of the network node 154, which illustrates an alternate mode of operation in accordance with an embodiment of the invention. This embodiment is useful for passing traffic from one virtual machine to another virtual machine operating in the same hoar. When the data is passed by NIC 156 to FPGA 158, metadata, e.g., a single bit, provides a sufficient indication to FPGA 158 that the data is to be routed back to the host 170, after which it may be utilized in another virtual machine.

Ninth Embodiment

Figure 12:
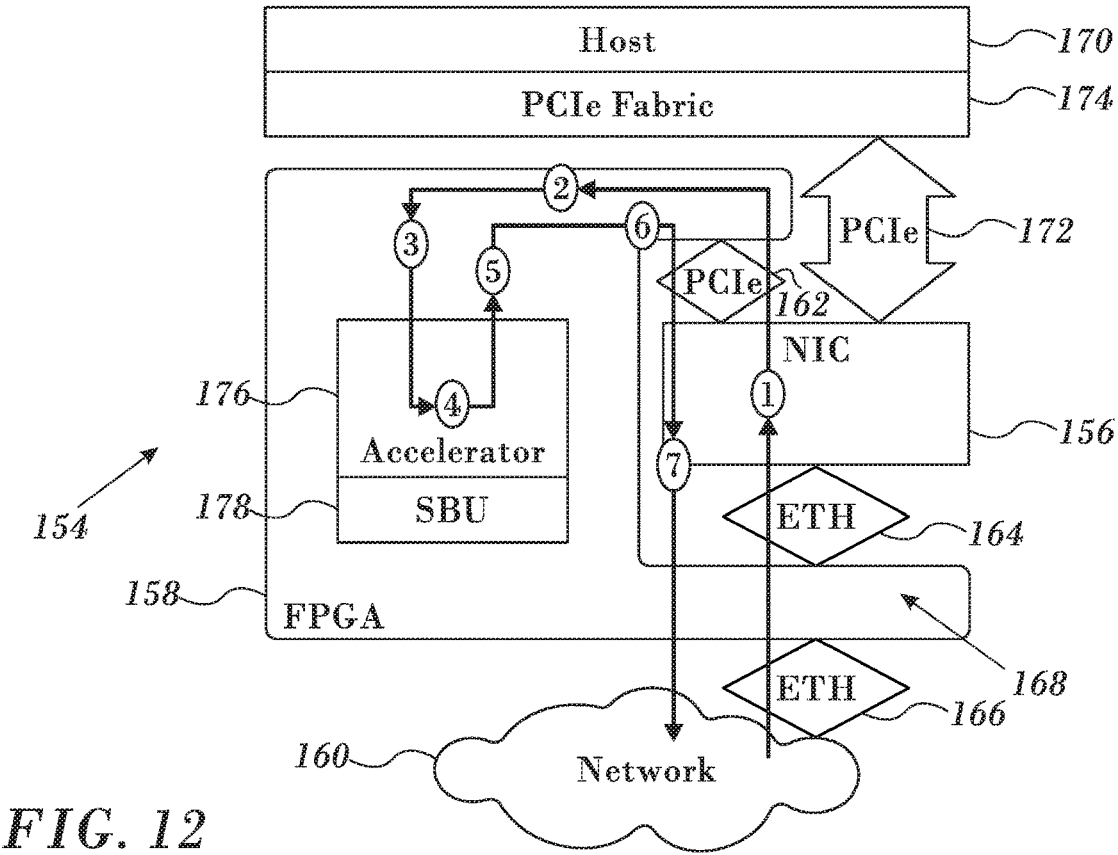
FIG. 12 is a schematic diagram of a network node, which illustrates an alternate mode of operation in accordance with an embodiment of the invention.

Reference is now made to FIG. 12, which is a schematic diagram of the network node 154, which illustrates an alternate mode of operation in accordance with an embodiment of the invention. In this embodiment data received from network 160 in NIC 156 undergoes acceleration using the pipeline 72 (FIG. 2) as described above, returning at each invocation of FPGA 158 to NIC 156, e.g., via the PCIe interface 162. The accelerated data then is transmitted back to the network 160. The transactions between NIC 156 and FPGA 158 occur without the data passing through the PCIe fabric 174 into the host 170.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication, comprising the steps of:
   receiving a packet in a network interface controller that is connected to a host and a communications network, the network interface controller comprising electrical circuitry configured as a packet processing pipeline having a plurality of stages;
   determining in the network interface controller that at least a portion of the stages of the pipeline are acceleration-defined stages;
   processing the packet in the pipeline, wherein processing the packet comprises:
   transmitting data to an accelerator from the acceleration-defined stages;
   performing respective acceleration tasks on the transmitted data in the accelerator; and
   returning processed data from the accelerator to receiving stages of the pipeline; and
   after processing the packet in the pipeline routing the packet toward a destination,
   wherein performing respective acceleration tasks comprises performing one of the acceleration tasks in a configurable unit of the accelerator;
   thereafter reporting a status of the one acceleration task from the accelerator to the network interface controller; and
   responsively to the status returning the processed data to the accelerator to perform another acceleration task.

2. The method according to claim 1, wherein the stages of the pipeline are organized in a hierarchy having levels, further comprising:
   in each of the levels of the hierarchy configuring the stages thereof by processes executing in respective domains.

3. The method according to claim 1, wherein for each of the acceleration tasks, the receiving stages differ from the acceleration-defined stages.

4. The method according to claim 1, further comprising accessing the network interface controller by a plurality of virtual machines having respective virtual network interface controllers, wherein returning processed data from the accelerator comprises transmitting the processed data from one of the virtual network interface controllers to another of the virtual network interface controllers.

5. The method according to claim 1, wherein transmitting data to an accelerator comprises the steps of:

adding metadata to the data; and
determining in the accelerator responsively to the metadata whether to perform acceleration on the data or to direct the data to the communications network.

6. The method according to claim 1, wherein the one acceleration task is a decryption of a portion of the packet, and the other acceleration task is an acceleration of the decrypted portion of the packet.

7. The method according to claim 1, wherein transmitting data to an accelerator comprises transmitting an indication to perform a specified acceleration task.

8. The method according to claim 7, wherein transmitting data to an accelerator is performed in one virtual machine, and the indication comprises an instruction to the accelerator to route the processed data to the host for use in another virtual machine.

9. The method according to claim 1, wherein routing the packet toward a destination comprises routing the packet to the communications network while avoiding transmitting the packet to the host.

10. A communications apparatus, comprising:
a host processor;
a network interface controller coupled to the host processor and to a communications network, the network interface controller comprising electrical circuitry configured as a packet processing pipeline having a plurality of stages;
an accelerator linked to the network interface controller, wherein the network interface controller is configured for:
receiving a packet;
determining that at least a portion of the stages of the pipeline are acceleration-defined stages;
processing the packet in the pipeline, wherein processing the packet comprises:
transmitting data to the accelerator from the acceleration-defined stages;
performing respective acceleration tasks on the transmitted data in the accelerator; and
returning processed data from the accelerator to receiving stages of the pipeline; and
after processing the packet in the pipeline routing the packet toward a destination,
wherein performing respective acceleration tasks comprises performing one of the acceleration tasks in a configurable unit of the accelerator;
thereafter reporting a status of the one acceleration task from the accelerator to the network interface controller; and
responsively to the status returning the processed data to the accelerator to perform another acceleration task.

11. The apparatus according to claim 10, wherein the stages of the pipeline are organized in a hierarchy having levels, further comprising:
in each of the levels of the hierarchy configuring the stages thereof by respective processes executing in corresponding domains.

12. The apparatus according to claim 10, wherein for each of the acceleration tasks, the receiving stages differ from the acceleration-defined stages.

13. The apparatus according to claim 10, wherein the host processor is configured as a plurality of virtual machines having respective virtual network interface controllers that access the network interface controller, wherein returning processed data from the accelerator comprises transmitting the processed data from one of the virtual network interface controllers to another of the virtual network interface controllers.

14. The apparatus according to claim 10, wherein transmitting data to an accelerator comprises the steps of:
adding metadata to the data; and
determining in the accelerator responsively to the metadata whether to perform acceleration on the data or to direct the data to the communications network.

15. The apparatus according to claim 10, wherein the one acceleration task is a decryption of a portion of the packet, and the other acceleration task is an acceleration of the decrypted portion of the packet.

16. The apparatus according to claim 10, wherein transmitting data to the accelerator comprises transmitting an indication to perform a specified acceleration task.

17. The apparatus according to claim 16, wherein transmitting data to the accelerator is performed in one virtual machine, and the indication comprises an instruction to the accelerator to route the processed data to the host processor for use in another virtual machine.

18. The apparatus according to claim 10, wherein routing the packet toward a destination comprises routing the packet to the communications network while avoiding transmitting the packet to the host processor.

19. A method of communication, comprising the steps of:
receiving a packet in a network interface controller that is connected to a host and a communications network, the network interface controller comprising electrical circuitry configured as a packet processing pipeline having a plurality of stages;
determining in the network interface controller that at least a portion of the stages of the pipeline are acceleration-defined stages;
processing the packet in the pipeline, wherein processing the packet comprises:
transmitting data to an accelerator from the acceleration-defined stages;
performing respective acceleration tasks on the transmitted data in the accelerator; and
returning processed data from the accelerator to receiving stages of the pipeline; and
after processing the packet in the pipeline routing the packet toward a destination,
wherein performing respective acceleration tasks comprises performing one of the acceleration tasks in a sandbox unit of the accelerator;
thereafter reporting a status of the one acceleration task from the accelerator to the network interface controller; and
responsively to the status returning the processed data to the accelerator to perform another acceleration task.

20. The method according to claim 19, wherein the one acceleration task is a decryption of a portion of the packet, and the other acceleration task is an acceleration of the decrypted portion of the packet.

21. A communications apparatus, comprising:
a host processor;
a network interface controller coupled to the host processor and to a communications network, the network interface controller comprising electrical circuitry configured as a packet processing pipeline having a plurality of stages;
an accelerator linked to the network interface controller, wherein the network interface controller is configured for:
receiving a packet;

determining that at least a portion of the stages of the pipeline are acceleration-defined stages;

processing the packet in the pipeline, wherein processing the packet comprises:

transmitting data to the accelerator from the acceleration-defined stages;

performing respective acceleration tasks on the transmitted data in the accelerator; and returning processed data from the accelerator to receiving stages of the pipeline; and after processing the packet in the pipeline routing the packet toward a destination, wherein performing respective acceleration tasks comprises performing one of the acceleration tasks in a sandbox unit of the accelerator;

thereafter reporting a status of the one acceleration task from the accelerator to the network interface controller; and responsively to the status returning the processed data to the accelerator to perform another acceleration task.

22. The apparatus according to claim 21, wherein the one acceleration task is a decryption of a portion of the packet, and the other acceleration task is an acceleration of the decrypted portion of the packet.

* * * * *